Nov. 3, 1964  R. VOLES  3,155,964
RADAR MAPPING SYSTEMS
Filed Aug. 25, 1958  3 Sheets-Sheet 1

Inventor
R. Voles

Nov. 3, 1964   R. VOLES   3,155,964
RADAR MAPPING SYSTEMS
Filed Aug. 25, 1958   3 Sheets-Sheet 3

Inventor
R. Voles
By Glascott Downing Seebold
Attys.

3,155,964
RADAR MAPPING SYSTEMS
Roger Voles, London, England, assignor to Electric & Musical Industries Limited, Hayes, Middlesex, England, a company of Great Britain
Filed Aug. 25, 1958, Ser. No. 757,155
Claims priority, application Great Britain, Aug. 28, 1957, 27,041/57
5 Claims. (Cl. 343—5)

This invention relates to radar mapping systems, and especially to radar mapping systems suitable for carrying in aircraft.

It has been proposed to carry radar aerials on aircraft and arranged to transmit pulse energy, the time of arrival and strength of reflected signals in a particular direction, giving information as to the range of a reflecting object. However the aircraft may be liable to pitch, roll and yaw with the undesirable effect that variations of received power can be produced due to unpredictable motion of the craft. These effects can manifest themselves for example as undesirable stripe like patterns on a contour display produced by the mapping equipment. To compensate for this it has been proposed to mount the aerial on gymbals thereby maintaining it in a horizontal plane. This remedy is however only practically possible with relatively small aerials or aerial arrays and since it is often required by reason of their improved operating characteristics to use aerials whose length may be of the same order as that of the aircraft itself the above difficulty may be regarded in general as hitherto unresolved.

The object of the present invention is to remove or at least substantially reduce the above disadvantage.

According to the present invention there is provided mobile radar apparatus comprising an aerial capable of receiving signals transmitted or reflected from a distant object, a receiver operative to detect signals received by said aerial and means responsive to variations of attitude of said aerial in relation to a given attitude to control the gain of said receiver, whereby errors in the power of received signals due to said variation are substantially reduced.

According to a feature of the present invention there is provided an aerial mounted in an aircraft, said given attitude being horizontal and parallel to the direction of flight of said aircraft the most significant of said variations being those due to roll of said aircraft and the gain control of said receiver being responsive to the angle of said roll.

Figure 1:
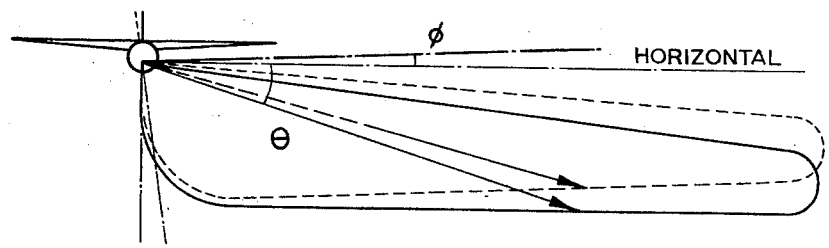
Figure 3:
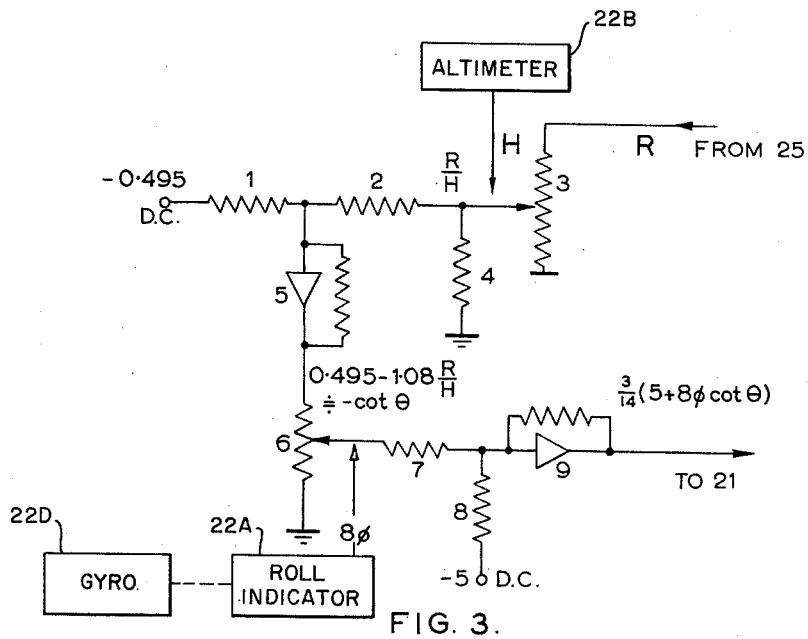
Figure 2:
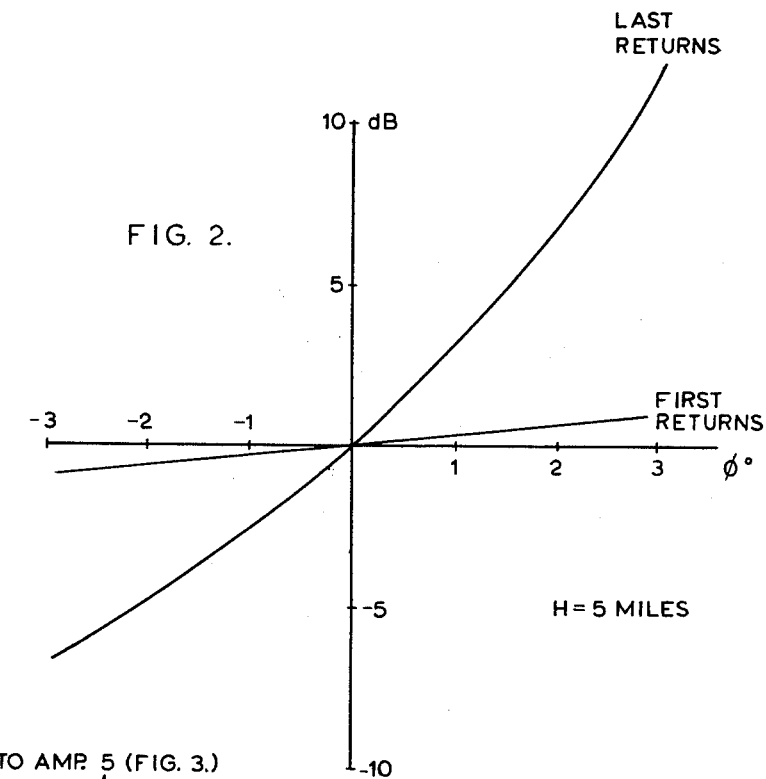
Figure 3A:
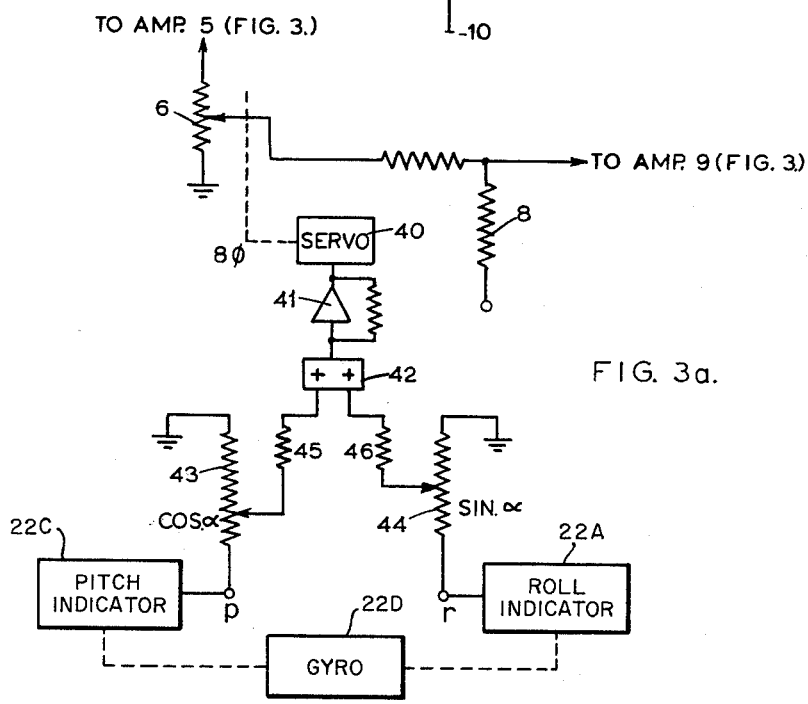
Figure 4:
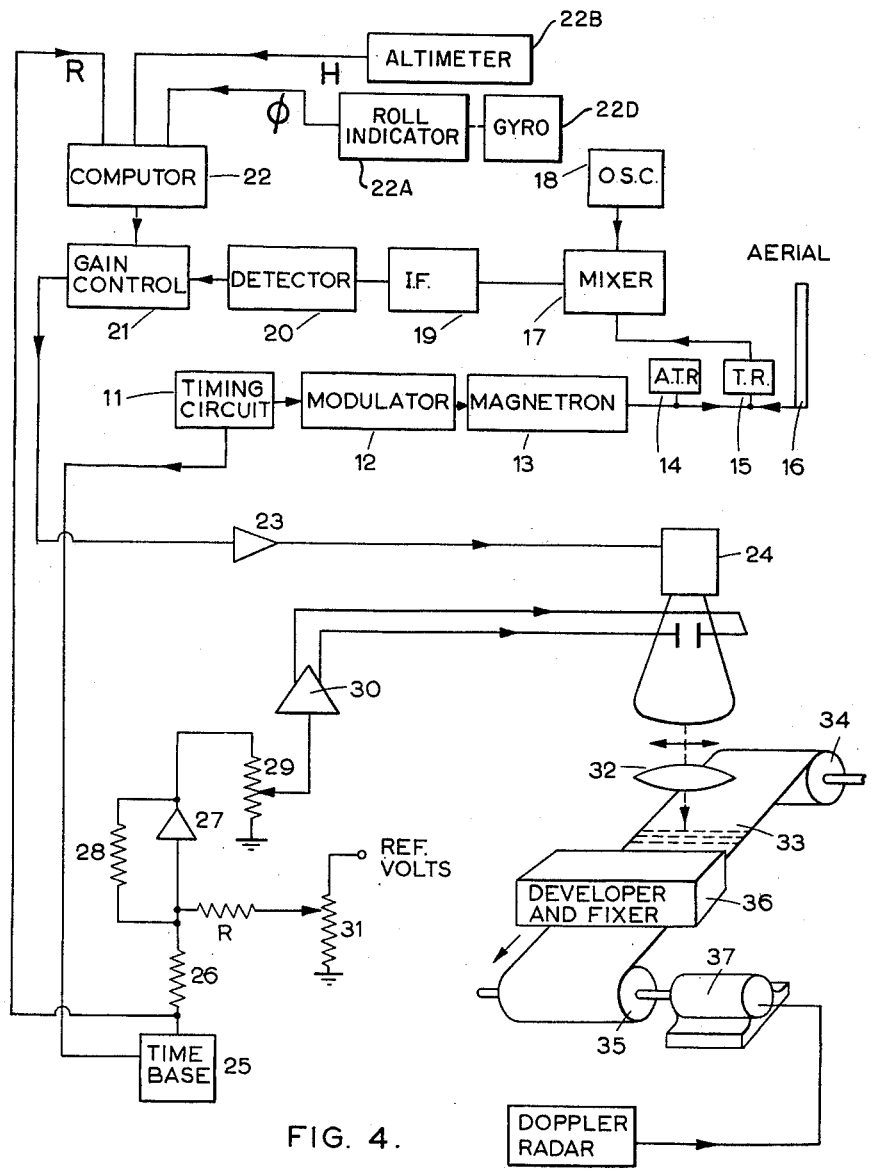

In order that the present invention may be clearly understood and readily carried into effect the invention will now be described with reference to the accompanying drawings of which:

FIGURE 1 illustrates the polar diagram of an aerial suitable for use with the present invention, being carried in an aircraft, FIGURE 2 illustrates in graphical form the effects of roll on the radar system employing an aerial of the type shown in FIGURE 1, FIGURE 3 illustrates a computer for providing gain control signals according to one aspect of the present invention, FIGURE 3a illustrates a modification to the computer shown in FIGURE 3, and FIGURE 4 illustrates mainly in block form an example of radar apparatus according to the invention.

Referring to FIGURE 1, this figure illustrates an aircraft flying in a direction normal to the plane of the drawing and carrying a single aerial having a cosec² $\theta$ polar diagram in the vertical plane, where $\theta$ is the angle of depression from the horizontal. The aerial will be assumed to be a slot aerial being up to 40 feet or more in length and mounted along the fuselage of the aircraft. The effect of roll of the aircraft on the polar diagram of the aerial is illustrated by the dotted outline and the roll angle is denoted by $\phi$. As is well known the use of an aerial having a cosec² $\theta$ polar diagram and which is not subject to roll gives normalized returns from point targets on the ground reflecting radiated pulse energy but when the aircraft carrying the aerial rolls the energy of echoes received from the ground is clearly then dependent upon the range and also upon the angle of roll $\phi$.

It should be understood that the power returned from pulses transmitted by such an aerial in general varies according to an $R^{-4}$ law for targets whose dimensions are small compared with the beam width intercept and according to an $R^{-3}$ law for targets whose dimensions are greater than the beam width intercept, R being the range. An $R^{-4}$ law is assumed in the present description but the invention is not limited thereto.

Considering therefore a point target which subtends an angle of depression $\theta$ from the horizontal at the aircraft the ratio of the received power to the power with a zero roll angle is given by the expression:

$$\frac{\sin^4 \theta \, \csc^4 (\theta+\phi)}{\sin^4 \theta \, \csc^4 \theta} \quad (1)$$

and this reduces approximately to the expression $$(1+\phi \cot \theta)^{-4} \quad (2)$$

if $\phi$ is considerably less than 1.

FIGURE 2 illustrates graphs of the above ratio against $\phi$ for first returns (where $\theta$ is 45°) and last returns, for a range of 45 miles. These graphs are based on the assumption of an altitude of 5 miles. It is evident that the gain of the system is much more sensitive to roll for reflections over the greater ranges for a given altitude. It is clear therefore that some form of correction is required for the effects of varying roll angle $\phi$. The correction necessary is moreover a function of range.

In the present aspect of the invention it is assumed that the reflected energy which is picked up by the aerial is used after amplification to operate as an intensity signal for a cathode ray display focussed on a photographic paper which moves at a speed proportional to the speed of the craft carrying the aerial. This display is arranged in a suitable manner so that the electron beam is caused to scan the screen of the tube along a given line projected onto the photographic recording medium and the aircraft which carries the aerial is assumed to fly across the narrow area covered by the polar diagram of the aerial in the time taken for the electron beam to scan for instance 100 lines or more on the display. This enables a sufficient degree of integration of the received information. The aerial itself is provided with suitable switching mechanism for transmitting a pulse at each successive line scan on the display. Thus positions along a line may be regarded as indicative of range within the polar diagram for the aerial.

A complete radar mapping system according to the invention is shown in FIGURE 4. Since the majority of the components are well known, FIGURE 4 is mainly of block form and those blocks which are not known will be described in detail. A timing circuit 11 which may comprise a pulse generator of known form provides D.C. pulses of predetermined duration of the order of one micro second and feeds these pulses to the modulator circuit 12. The pulses repetition rate may be 200 to 5,000 cycles per second and the modulator amplifies these pulses and applies them to a magnetron oscillator 13. The oscillator 13 provides pulses of short wave oscillations in response to the input pulses from 12 and these are applied via an A.T.R. (anti-transmit-receive) switch 14 and a T.R. (transmit-receive) switch 15 to the aerial 16. The aerial 16 is preferably a slot aerial and its length is comparable with the length of the fuselage of the aircraft which carries it, the axis of the aerial being substantially along the direction of flight of the craft. The aerial may be of known form to have a cosec² θ radiation pattern in the vertical plane with a main lobe normal to the axis of the aerial and will not be described further but clearly any aerial with these characteristics may be used. The A.T.R. (anti-transmit-receive) switch 14 and the T.R. (transmit-receive) switch 15 are arranged in known manner to be associated with quarter wave lines so that the switches are struck by an outgoing pulse from the magnetron 13, the switch 15 forming a short circuit and therefore in combination with the quarter wave line which connects it to the line between 13 and 16 presents a high impedance thereto so that energy transmitted from the magnetron is not transmitted by 15 to the receiving part of the apparatus. When the pulses from 13 stop the anti-T.R. switch 14 causes a short circuit to be presented to the line and therefore an open circuit looking at 15 so that substantially all power received by the aerial 16 is transmitted via 15 to the mixer circuit 17 of the receiver section. Associated with 17 is a local oscillator 18 of known form, comprising a reflex klystron or a triode oscillator to provide short wave local oscillations. The output of the mixer is in the form of pulses of moderately high frequency and these pulses are applied to the intermediate frequency amplifier 19 where they are amplified and applied to a detector 20 of the well known diode type.

The apparatus as so far described is substantially as described in the book entitled "Radio and Radar Technique" by A. T. Starr, page 44.

The output of the detector 20 is amplified in the gain controlled amplifier 21. Gain control signals for 21 are derived from the computer 22 which according to the invention is arranged to provide correction signals responsive to the indicator 22A which produces an output signal representing the roll of the aircraft and the height of the aircraft indicated by the altimeter 22B. The computer 22 will be described in greater detail hereafter. The output of 21 is applied via further amplification stages 23 to the modulator of a cathode-ray display tube 24 to modulate the intensity of the spot which scans the screen of the display tube.

In addition to providing D.C. pulses for the modulator 12, the timing circuit 11 provides input signals to the time base circuit 25 for the cathode ray tube, which provides scanning potentials to cause the beam of the tube to scan across the tube to represent range measurements. The output of 25 is applied via a resistor 26 to an amplifier 27 having a feedback resistor 28. The output of 27 is applied to one terminal of a potentiometer 29 the other terminal of which is earthed. The movable contact 29 is connected to the input of an amplifier 30 and the output voltage from 30 is applied to the deflection plates of the cathode ray tube 24. The input terminal 27 is connected via a resistor $r$ to the movable contact of a further potentiometer 31, this potentiometer having a reference voltage applied across it so that a backing off potential is derived from it and applied to the input 27.

The cathode ray tube 24 is provided with a focusing system represented by the lens 32 to focus the spot on to a photographically sensitive paper 33. The paper 33 is in the form of a long strip which is run from a magazine roll 34 on to a receiving roll 35 via a developing and fixing unit 36. The roll 35 is driven by a motor 37 at a steady speed which is proportional to the land speed of the aircraft which carries the aerial 16. This speed is determined by means of a conventional Doppler radar arrangement which will not be described further but details of such a radar system may be found in "British Communications and Electronics" September 1957, pages 551–553. It will be understood that adjustment must be made for height and to take account of the radius of the earth. Preferably the sepeed control for 37 is automatic but may if desired be manual.

In operation of the arrangement it will be assumed that a pulse of energy has been transmitted by the aerial 16 and 14 and 15 are switched for reception of signals. Clearly pulses reflected from nearer objects are received first and are mixed in 17 to provide an I.F. signal which is detected and transmitted via the amplifier 21 and 23 to the modulator 24. Further it will be assumed that the the computer 22 is operating to provide a gain control signal for 21 to maintain the intensity of the cathode ray tube beam at a given level irrespective of the roll of the aircraft. At the same time, the time base circuit 25 is providing deflection signals for the tube 24 and therefore the light spot scans across the paper to provide a photographic record of reflecting objects on the ground within the area covered by the system. This record is continuously developed and fixed in known manner in 36 and can thereafter be referred to as desired. Since the rate of travel of the paper 33 beneath the cathode ray tube is proportional to the speed of the aircraft the result obtained is a map of the area over which the aircraft is flying and the map is free from stripe like patterns which in the absence of the gain control circuits 21 and 22 must be present if the aircraft has any tendency to roll.

By setting the position of the movable contact of 29 the scanning voltage for 24 may be varied to give a desired magnification on the record 33. This is especially useful when it is only desirable to map a relatively narrow strip of the area covered by the radiation lobe of the aerial 16 and this area can be selected by means of the potentiometer 31 which backs off the scanning voltage to bring the required area into registration on the cathode ray tube. The potentiometer 29 can then be varied to scale up the desired strip to make it fill the display area of the tube and hence cover the full width of the paper 33. If the gain control in the receiver amplifier 21 is effected at a point in the receiver up to which the receiver is linear, clearly in view of the expression (2) given above the required voltage gain control law is of the form $$g = (1 + \phi \cot \theta)^2 \qquad (3)$$

If therefore the altitude of the aerial 16 is H, $$\cot \theta = \sqrt{\left(\frac{R}{H}\right)^2 - 1}$$

and imposing the earlier mentioned condition of a minimum altitude of about 5 miles, maximum range of 45 miles and earliest returns required to be displayed returns of reflected power at θ=45°, the range of ranges obtained is $$\sqrt{2H} \leqslant R \leqslant 9H$$

Consequently, over this range cot θ approximates within $$4\% \text{ to } -0.495 + 1.08 \left(\frac{R}{H}\right) \qquad (4)$$

This expression for cot θ may be substituted in the above expression for gain control and the best linear approximation is $$g = \frac{3}{14} (5 + 8\phi \cot \theta) \qquad (5)$$

FIGURE 3 of the drawings illustrates in diagrammatical form one construction for the computer 22 for deriving gain control signals according to the function (5). A D.C. bias representing the numerical quantity −0.495 is applied via the resistor 1 to the input to the amplifier 5 and at the same time a signal proportional to the time base voltage for the display tube is applied to the potentiometer 3 of which one end is open circuited. The movable contact of this potentiometer is also connected to the input of 5 via the resistor 2, and to ground via the resistor 4. The setting of the movable contact of 3 may be automatically or manually adjusted to represent the altitude of the flight for the aircraft carrying the radar equipment and as mentioned above the signal applied to 3 is proportional to the instantaneous range on which the equipment is operating so that with suitable choice of the resistor 4, the signal derived by the movable contact and applied to the input to 5 is proportional to the quotient $R/H$. The constant of proportionality, 1.08 may be introduced instrumentally in the circuit. Thus the signal set up across potentiometer 6 by the operation of components 1 to 5 is an analogue of $-\cot \beta$ and a movable contact is arranged to slide along this to a position representing eight times the angle of roll $\phi$. This may be set up by means of a shaft actuated by a roll indicator 22A which responds to a known form of gyroscopic control device 22D. The signal derived by the moveable contact on 6 is applied via the resistor 7 together with a D.C. bias representing the numerical term $-5$ in the above expression, applied via the resistor 8 to the input to the see-saw amplifier 9, the output of which then is proportional to the required gain control signal. This signal is thereafter applied to control the gain of a linear portion of the receiver amplifier 21 of FIGURE 4. In the case of a logarithmic receiver the computer of FIGURE 3 should clearly be arranged to control the gain of the receiver at an early stage.

In the foregoing description of an embodiment of the present invention, it has been assumed that the aircraft carrying the aerial is subject only to roll but clearly the craft may equally well be subject to pitch. This assumption is justified however since pitch may be assumed to have negligible effect upon the system when the aerial beam is directed at an angle $\alpha$ equal to $\pi/2$ to the direction of flight of the aircraft but if it is desirable to displace the beam direction by a small angle and if the craft pitches and rolls by small angles $p$ and $r$ respectively, the above angle $\phi$ may be expressed in appropriate form as $$\phi = p \cos \alpha + r \sin \alpha$$

The circuit arrangement of FIGURE 3 may for example be modified as shown in FIGURE 3a to derive $\phi$ from potentiometers operated by shafts which are set to positions representing $\alpha$, $p$ and $r$. Indications of the pitch angle $p$ and the roll angle $r$ are derived from indicators 22C and 22A respectively coupled to the gyroscopic device 22D. Naturally, more accurate computing would give $\phi$ if $p$ and $r$ are not small. A circuit arrangement comprising known components for deriving a signal representing $\phi$ as a function of $p$ and $r$ when the aerial beam is directed at an angle $\alpha$ to the direction of flight of the aircraft is shown in FIGURE 3a. In FIGURE 3a the potentiometer 6 and the resistor 8 correspond to those shown in FIGURE 3. The movable contact of 6 is driven by a conventional servo mechanism denoted by block 40 which receives, via amplifier 41, a signal proportional to the sum of the D.C. potentials derived from potentiometers 43 and 44 via resistors 45 and 46, applied to the adding circuit 42. The potentials applied across 43 and 44 are proportional respectively to $p$ and $r$ and can be derived directly as indicated above from potentiometers which are continuously adjusted in response to a gyroscopic device in the aircraft. The tapping points on 43 and 44 are selected to tap off a proportion of the potential applied across these potentiometers, proportional to $\cos \alpha$ and $\sin \alpha$ respectively. Thus the servo motor 40 continuously sets the potentiometer 6 to a position which is proportional to $8\phi$, the constant "8" being introduced by the amplifier 41.

Although moreover the invention has been described in relation to a single aerial carried by an aircraft giving a survey area extending on one side of the aircraft, the invention is equally applicable to an arrangement comprising two or more aerials arranged to give survey coverage area extending outward on both sides of the aircraft.

What I claim is:

1. Radar apparatus comprising an aerial capable of receiving signals transmitted or reflected from a distant object, a receiver operative to detect signals received by said aerial and means responsive to variations of attitude of said aerial in relation to a given attitude to control the gain of said receiver, whereby errors in the power of received signals due to said variations are substantially reduced.

2. In an aircraft, radar apparatus comprising an aerial capable of receiving signals transmitted or reflected from a distant object, a receiver operative to detect signals received by said aerial, said aerial being mounted in the aircraft with the longitudinal dimension of the aerial substantially parallel to the direction of flight of said aircraft and said aerial having a radiation lobe in a plane at right angles to said dimension, first indicating means for producing an indication of the angle of roll of said aircraft about an axis parallel to said dimension, second indicating means for producing an indication of the angle about said axis at which a signal is received by said aerial, and means for controlling the gain of said receiver in response to the indication produced by said first and second indicating means to reduce error in the power of a received signal due to roll of said aircraft about said axis.

3. Apparatus according to claim 2 in which said means for producing an indication of the angle about said axis at which a signal is received comprises a source of a signal representing the range from which the signal is received, a source of a signal representing the altitude of the aircraft, and means responsive to the signals from said sources for producing said indication.

4. Apparatus according to claim 2 comprising third indicating means for producing an indication of the angle of pitch of said aircraft, said means for controlling the gain of said receiver being responsive to the indications produced by said first, second and third indicating means.

5. In an aircraft, radar apparatus comprising an aerial capable of receiving signals transmitted or reflected from a distant object, a receiver operative to detect signals received by said aerial, said aerial being mounted in the aircraft with the longitudinal dimension of the aerial substantially parallel to the direction of flight of the aircraft, and said aerial having a cosecant squared polar diagram in a plane at right angles to said dimension to normalize the power of signals received from different angles and therefore from different ranges, provided the aircraft remains in level flight, and means responsive to variations in the attitude of the aerial caused by departures of the aircraft from the condition of level flight for controlling the gain of said receiver, thereby to reduce variations in the power of received signals due to said variations in altitude of the aerial.

References Cited in the file of this patent

UNITED STATES PATENTS

| | | |
|---|---|---|
| 2,467,319 | King et al. | Apr. 12, 1949 |
| 2,605,463 | Hirschberg et al. | July 29, 1952 |
| 2,616,077 | Holser | Oct. 28, 1952 |
| 2,639,423 | Sherr | May 19, 1953 |
| 2,753,552 | Hom | July 3, 1956 |